United States Patent [19]

Wilson et al.

[11] Patent Number: 4,707,326
[45] Date of Patent: Nov. 17, 1987

[54] ARRANGEMENT AND METHOD FOR ATTACHING AND REATTACHING A TOP NOZZLE IN A RECONSTITUTABLE NUCLEAR FUEL ASSEMBLY

[75] Inventors: John F. Wilson, Murrysville; Robert K. Gjertsen, Monroeville; Joseph B. Mayers, Greensburg, all of Pa.

[73] Assignee: Westinghouse Electric Corp., Pittsburgh, Pa.

[21] Appl. No.: 759,382

[22] Filed: Jul. 26, 1985

[51] Int. Cl.⁴ .................. G21C 19/00; G21C 3/32
[52] U.S. Cl. .................. 376/261; 376/353; 376/446; 376/449; 29/400 N; 29/402.05; 29/523
[58] Field of Search .......... 376/446, 449, 353, 364, 376/261, 285; 29/400 N, 401.1, 523, 402.05, 402.08, 723

[56] References Cited

U.S. PATENT DOCUMENTS

| | | | |
|---|---|---|---|
| 3,770,583 | 11/1973 | Klumb et al. | 376/364 |
| 3,814,667 | 6/1974 | Klumb et al. | 376/364 |
| 3,980,519 | 9/1976 | Taft | 376/225 |
| 4,219,386 | 8/1980 | Osborne et al. | 376/446 |
| 4,269,661 | 5/1981 | Kmonk et al. | 376/353 |
| 4,278,501 | 7/1981 | Steinke | 376/364 |
| 4,326,921 | 4/1982 | Cadwell | 376/449 |
| 4,376,092 | 3/1983 | Kmonk et al. | 376/449 |
| 4,534,933 | 8/1985 | Gjertsen et al. | 376/353 |
| 4,535,523 | 8/1985 | Leclercq | 376/446 |
| 4,572,816 | 2/1986 | Gjertsen et al. | 376/364 |
| 4,641,409 | 2/1987 | Shallenberger et al. | 376/446 |

FOREIGN PATENT DOCUMENTS

| | | | |
|---|---|---|---|
| 0036821 | 9/1981 | European Pat. Off. | 376/446 |
| 1159971 | 7/1969 | United Kingdom | 376/364 |
| 2129189 | 5/1984 | United Kingdom | 376/446 |

Primary Examiner—Deborah L. Kyle
Assistant Examiner—Daniel Wasil

[57] ABSTRACT

An improved arrangement for attaching and reattaching a top nozzle of a reconstitutable fuel assembly includes a sleeve member associated with each guide thimble of the fuel assembly and complementary elements for attaching the sleeve member and the upper end portion of the guide thimble together. The sleeve member includes an inner tubular alignment sleeve portion which receives the guide thimble upper end portion and extends between the upper hold-down and lower adapter plates of the top nozzle. The sleeve member also includes an outer tubular shroud portion having a lower annular flange which underlies a coil spring surrounding the sleeve portion and interconnects the shroud portion and the sleeve portion. The outer shroud portion extends upwardly about a portion of the coil spring for protecting the spring from damage by coolant cross flow from adjacent fuel assemblies. The complementary elements include upper primary and lower secondary interior spaced annular grooves formed on the alignment sleeve portion and a primary exterior bulge formed on the guide thimble upper end portion. The primary bulge extends into the primary annular groove to connect the sleeve portion to the guide thimble. The secondary groove is adapted to receive a secondary exterior bulge, being formed on the guide thimble upper end portion after an initial severance of an upper segment of the upper end portion, for reconnection of the alignment sleeve portion and the severed guide thimble together.

8 Claims, 9 Drawing Figures

ARRANGEMENT AND METHOD FOR ATTACHING AND REATTACHING A TOP NOZZLE IN A RECONSTITUTABLE NUCLEAR FUEL ASSEMBLY

CROSS REFERENCE TO RELATED APPLICATIONS

Reference is hereby made to the following copending applications dealing with related subject matter and assigned to the assignee of the present invention:

1. "Reconstitutabale Nuclear Reactor Fuel Assembly With Unitary Removable Top Nozzle Subassembly" by John M. Shallenberger, assigned U.S. Ser. No. 673,681 and filed Nov. 20, 1984, a continuation-in-part of copending U.S. patent application Ser. No. 457,790 filed Jan. 13, 1983, now abandoned.

2. "Improved Removable Top Nozzle Subassembly For A Reconstitutable Nuclear Fuel Assembly" by John F. Wilson et al, assigned U.S. Ser. No. 701,049 and filed Feb. 12, 1985.

3. "Device And Method For Unfastening And Lifting A Top Nozzle Subassembly From A Reconstitutable Fuel Assembly" by John F. Wilson et al, assigned U. S. Ser. No. 720,208 and filed Apr. 4, 1985, new U.S. Pat. No. 4,646,415.

4. "Integral Reusable Locking Arrangement For A Removable Top Nozzle Subassembly Of A Reconstitutable Nuclear Fuel Assembly' by Robert K. Gjertsen et al, assigned U.S. Ser. No. 857,675 and filed Apr. 30, 1986.

BACKGROUND OF THE INVENTION

1. Field of the Invention

The present invention relates generally to reconstitutable fuel assemblies for nuclear reactors and, more particularly, is concerned with an arrangement and method for attaching and reattaching a top nozzle in a reconstitutable fuel assembly.

2. Description of the Prior Art

Conventional designs of fuel assemblies include a multiplicity of fuel rods held in an organized array by grids spaced along the fuel assembly length. The grids are attached to a plurality of control rod guide thimbles. Top and bottom nozzles on opposite ends of the fuel assembly are secured to the control rod guide thimbles which extend above and below the opposite ends of the fuel rods. At the top end of the fuel assembly, the guide thimbles are attached in openings provided in the top nozzle. Conventional fuel assemblies also have employed a fuel assembly hold-down device to prevent the force of the upward coolant flow from lifting a fuel assembly into damaging contact with the upper core support plate of the reactor, while allowing for changes in fuel assembly length due to core induced thermal expansion and the like. Such hold-down devices have included the use of springs surrounding the guide thimbles, such as seen in U.S. Pat. Nos. 3,770,583 and 3,814,667 to Klumb et al and 4,269,661 to Kmonk et al, and in the first patent application cross-referenced above.

Due to occasional failure of some fuel rods during normal reactor operation and in view of the high cost associated with replacing fuel assemblies containing failed fuel rods, the trend is currently toward making fuel assemblies reconstitutable in order to minimize operating and maintenance expenses. Conventional reconstitutable fuel assemblies incorporate design features arranged to permit the removal and replacement of individual failed fuel rods. Reconstitution has been made possible by providing a fuel assembly with a removable top nozzle. The top nozzle is mechanically fastened usually by a threaded arrangement to the upper end of each control rod guide thimble, and the top nozzle can be removed remotely from an irradiated fuel assembly while it is still submerged in a neutron-absorbing liquid. Once removal and replacement of the failed fuel rods have been carried out on the irradiated fuel assembly submerged at a work station and after the top nozzle has been remounted on the guide thimbles of the fuel assembly, the reconstituted assembly can then be reinserted into the reactor core and used until the end of its useful life.

One recently proposed design for a reconstitutable fuel assembly top nozzle is described and illustrated in the second patent application cross-referenced above. The proposed top nozzle overcomes certain problems associated with the removable top nozzle designs of the above-cited U.S. patents and first cross-referenced application. Specifically, it includes improved structures which eliminate relative sliding engagement between the upper core support plate and the hold-down structure of the top nozzle while providing removable mounting of the top nozzle as a unitary subassembly on the guide thimbles of the reconstitutable fuel assembly. The fourth cross-referenced application builds on the highly satisfactory design of the second application by providing an integral reusable locking arrangement for the removable top nozzle which requires no special tooling to actuate it and, as a result, greatly reduces the complexity of the fuel assembly reconstitution operation.

While the proposed removable top nozzle designs of the second and fourth cross-referenced patent applications, as just briefly described, were considered to be highly satisfactory solutions to the problems existing previously with regard to earlier designs, it has been recently recognized that even these do not provide optimum solutions to some of the earlier as well as other problems. Specifically, it has been found that protection of the individual hold-down springs of the top nozzle is inadequately provided for by the designs of either of the second and fourth cross-referenced applications. Further, in view that a fuel assembly typically will not be reconstituted more than two times (one time being a realistic estimate), the reusable looking arrangement of the fourth application is now considered to involve fabrication costs which are too high.

Consequently, a need exists for a different approach to spring protection from coolant cross flow and to top nozzle attachment and reattachment, one with the objective of retaining the beneficial design features of the top nozzle disclosed in the cross-referenced applications while avoiding their short-comings.

SUMMARY OF THE INVENTION

The present invention provides an arrangement and method for attaching and reattaching a top nozzle in a reconstitutable fuel assembly which is designed to satisfy the aforementioned needs. The arrangement of the present invention eliminates the costs of machining threads and of providing a reusable locking structure on each of the alignment sleeves and guide thimble upper end portions. It also provides individual spring protection from cross flow present in a transition core between coil spring and leaf spring fuel assembly designs. (inter-assembly cross flow in the top nozzle region could occur in a core with both coil spring and leaf spring fuel assembly designs.) The changes introduced by the present invention are compatible with the basic design of the top nozzle of the cross-referenced applications and, thus, can be readily implemented without affecting the upper hold-down plate and lower adapter plate castings.

Accordingly, the present invention is set forth in a reconstitutable fuel assembly having at least one control rod guide thimble and a top nozzle wherein the guide thimble includes an upper end portion and the top nozzle includes a lower adapter plate and an upper hold-down plate. The lower and upper plates have respectively an opening and passageway defined therethrough and aligned with one another. The opening in the lower plate receives the guide thimble therethrough with its upper end portion extending above the lower plate and toward the passageway of the upper plate. The present invention provides an improved arrangement for mounting the top nozzle on the guide thimble comprising; (a) alignment means extending between the plates and receiving the guide thimble upper end portion, the alignment means at an upper end being inserted into the passageway of the upper hold-down plate and at a lower end resting on the adapter plate; and (b) complementary means formed on and interconnecting the alignment means and the guide thimble upper end portion so as to connect the alignment means and the guide thimble together, the complementary means including a primary interior annular groove formed on the alignment means and a primary exterior bulge formed on the guide thimble upper end portion and extending into the primary annular groove.

Furthermore, the complementary means includes a secondary interior annular groove formed on the alignment means at a location spaced below the primary annular groove. The secondary groove is adapted to receive a secondary exterior bulge, which is formed on the guide thimble upper end portion after severance of an upper segment of the guide thimble upper end portion containing the primary bulge followed by removal and receipt of the severed guide thimble upper end portion from and back in the alignment means, for reconnection of the alignment means and the severed guide thimble together. Additionally, the complementary means also includes a primary interior section on the alignment means which contains the primary annular groove, and a secondary interior section on the alignment means which contains the secondary annular groove. The secondary section is disposed below the primary section and has an interior diameter larger than that of the primary section for facilitating receiving of the severed guide thimble upper end portion back into the alignment means for reconnection of the alignment means and the severed guide thimble together.

Still further, the arrangement includes an elongated shroud having a lower portion resting on the adapter plate and underlying a hold-down coil spring of the top nozzle. Also, the shroud has an upper portion extending along and surrounding a portion of the spring for protecting the spring from damage by coolant cross flow from adjacent fuel assemblies.

Also, in a method of making a fuel assembly reconstitutable, the present invention comprises the steps of (a) providing the alignment sleeve of the top nozzle with at least a pair of internal upper and lower annular grooves; (b) inserting the upper end portion of the guide thimble into the sleeve such that the upper end portion thereof extends adjacent the upper annular groove; and (c) bulging an annular part of the guide thimble upper end portion outwardly into the upper annular groove in the alignment sleeve so as to connect the sleeve and guide thimble together. Further, the present invention includes the steps of: (d) circumferentially cutting the guide thimble upper end portion at a location below the level of its annular part bulged into the upper annular groove in the alignment sleeve and above the level of the lower annular groove in the alignment sleeve to sever an upper segment of guide thimble upper end portion containing the bulged annular part from the remainder thereof; and (e) removing the top nozzle, including the alignment sleeve with the upper guide thimble segment connected thereto, from the severed guide thimble upper end portion for facilitating reconstitution of the fuel assembly. Finally, the present invention includes the steps of; (f) reinserting the severed upper end portion of the guide thimble into the sleeve such that the severed upper end portion thereof extends adjacent the lower annular groove; and (g) bulging another annular part of the severed guide thimble upper end portion outwardly into the lower annular groove in the alignment sleeve so as to connect the sleeve and guide thimble together.

These and other advantages and attainments of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which.

DETAILED DESCRIPTION OF THE INVENTION

Figure 1:
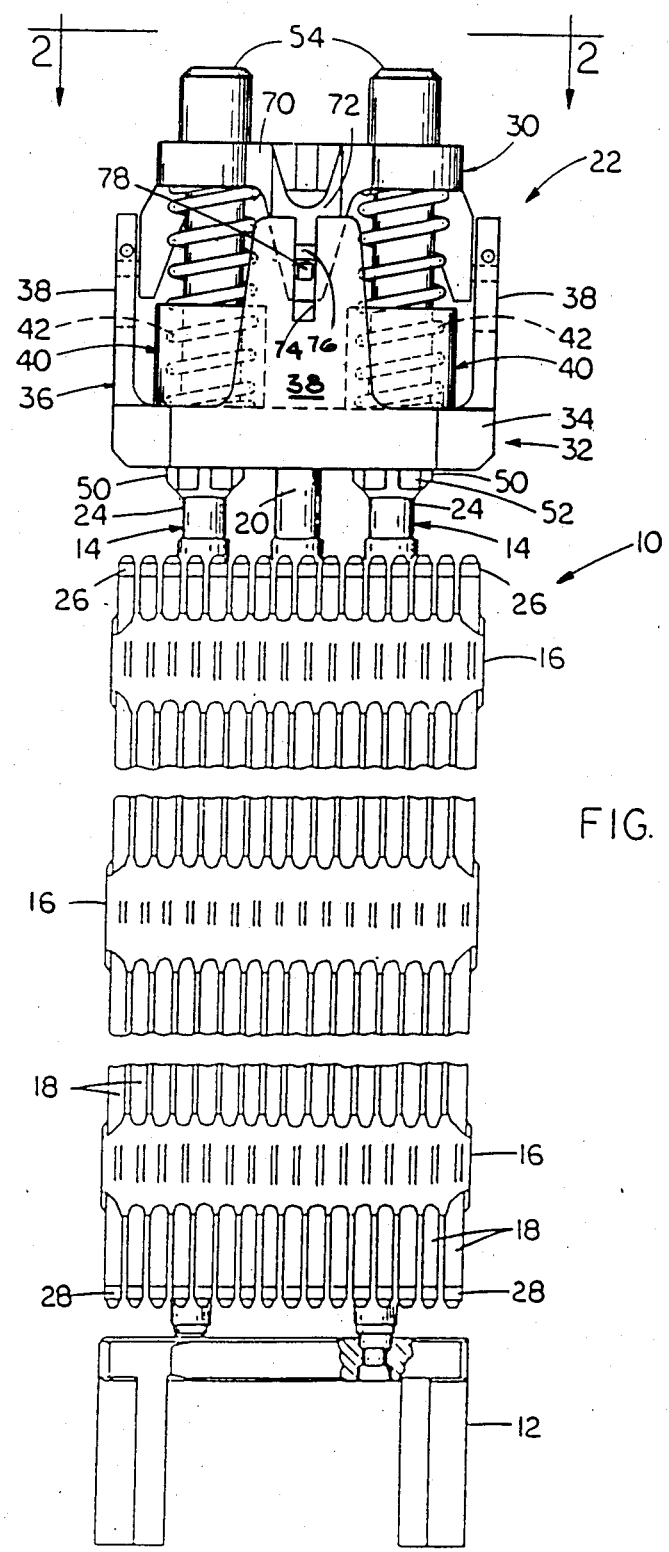
FIG. 1 is an elevational view, with parts broken away for clarity, of a reconstitutable fuel assembly having an arrangement for attaching and reattaching the top nozzle which is constructed in accordance with the principles of the present invention.

In the following description, like reference characters designate like or corresponding parts throughout the several views of the drawings. Also in the following description, it is to be understood that such terms as "forward", "rearward", "left", "right", "upwardly", "downwardly", and the like are words of convenience and are not to be construed as limiting terms.

IN GENERAL

Referring now to the drawings, and particularly to FIG. 1, there is shown an elevational view of a reconstitutable nuclear reactor fuel assembly, represented in vertically foreshortened form and being generally designated by the numeral 10. Basically, the fuel assembly 10 includes a lower end structure or bottom nozzle 12 for supporting the assembly on the lower core plate (not shown) in the core region of a reactor (not shown), and a number of longitudinally extending guide tubes or thimbles 14 which project upwardly from the bottom nozzle 12. The assembly 10 further includes a plurality of transverse grids 16 axially spaced along the guide thimbles 14 and an organized array of elongated fuel rods 18 transversely spaced and supported by the grids 16. Also, the assembly 10 has an instrumentation tube 20 located in the center thereof and an upper end structure or top nozzle 22 attached to the upper end portions 24 of the guide thimbles 14 which together incorporate certain features in accordance with the present invention which will be fully described below. With such arrangement of parts, the fuel assembly 10 forms an integral unit capable of being conventionally handled without damaging the assembly parts.

As mentioned above, the fuel rods 18 in the array thereof in the assembly 10 are held in spaced relationship with one another by the grids 16 spaced along the fuel assembly length. Each fuel rod 18 includes nuclear fuel pellets (not shown) and is closed at its opposite ends by upper and lower end plugs 26,28. The fuel pellets composed of fissile material are responsible for creating the reactive power of the reactor. A liquid moderator-coolant such as water, or water containing boron, is pumped upwardly through the guide thimbles 14 and along the fuel rods 18 of the fuel assembly 10 in order to extract heat generated therein for the production of useful work.

To control the fission process, a number of control rods (not shown) are reciprocally movable in the guide thimbles 14 located at predetermined positions in the fuel assembly 10. Since the control rods are inserted into the guide thimbles 14 from the top of the fuel assembly 10, the placement of the components forming the top nozzle 22 and their attachment to the upper end portions 24 of the guide thimbles 14, along with the features of the present invention, must accommodate the movement of the control rods into the guide thimbles 14 from above the top nozzle 22.

TOP NOZZLE SUBASSEMBLY

Figure 2:
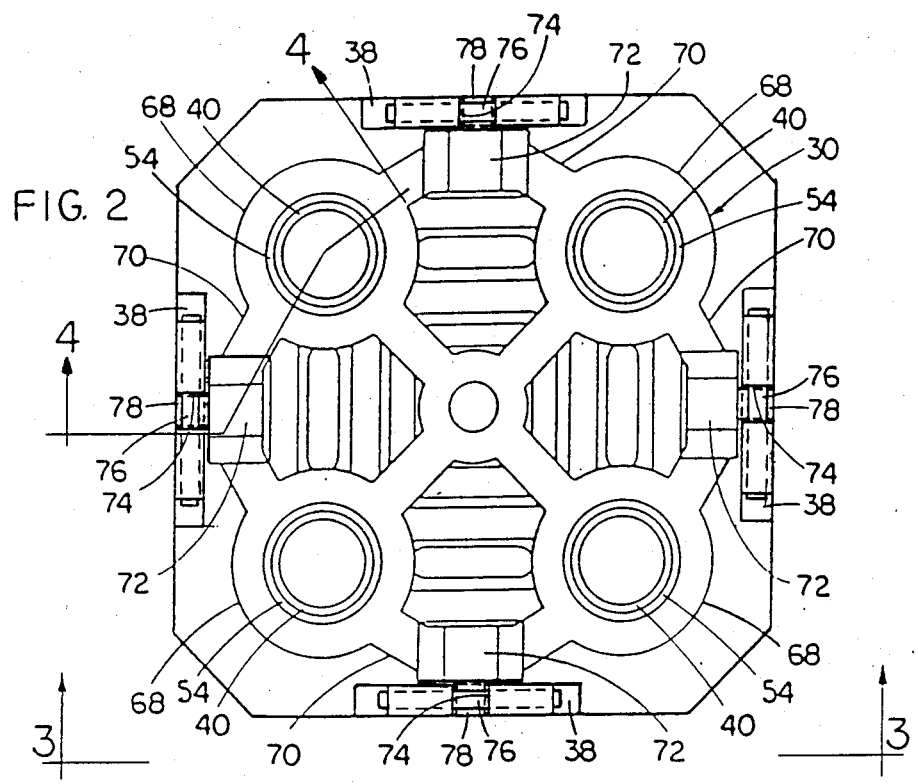
FIG. 2 is an enlarged top plan view of the reconstitutable fuel assembly as seen along line 2—2 of FIG. 1, showing the top nozzle incorporating the arrangement of the present invention.
Figure 3:
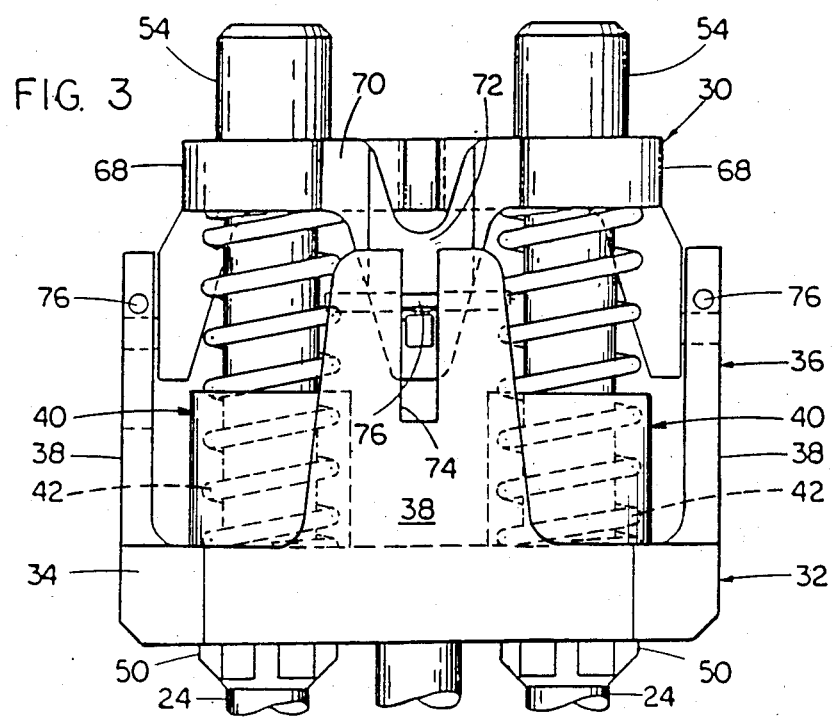
FIG. 3 is an enlarged elevational view of the top nozzle as seen along line 3—3 of FIG. 2.

Turning now to FIGS. 2 and 3, as well as FIG. 1, there is shown in greater detail the separate components making up the top nozzle 22 which is mounted on the upper end portions 24 of the guide thimbles 14 of the fuel assembly 10. The top nozzle 22 basically includes an upper hold-down plate 30, an enclosure 32 having a lower adapter plate 34 and an upstanding discontinuous sidewall 36 formed by a plurality of spaced upstanding wall portions 38 surrounding and attached to the periphery of the adapter plate, a plurality of sleeve members 40, comprising part of the features of the present invention to be described later, being disposed between the upper and lower plates 30,34, and a plurality of hold-down coil springs 42 extending between the upper and lower plates 30,34 and disposed in a manner to be described below relative to the sleeve members 40. The upper hold-down plate 30 has a plurality of passageways 44 defined therethrough, while the lower adapter plate has a plurality of openings 46, the passageways 44 and openings 46 being arranged in respective patterns which are matched to that of the guide thimbles 14 of the fuel assembly 10.

More particularly, the upper end portions 24 of the guide thimbles 14 extend upwardly through the openings 46 in the lower adapter plate 34 and above the upper surface 48 thereof. A plurality of lower retainers 50 are attached, such as by brazing, to the guide thimbles 14 below the lower adapter plate 34 for limiting downward slidable movement of the adapter plate 34 relative to the guide thimbles 14 and thereby supporting the adapter plate on the guide thimbles with the upper end portions 24 thereof extending above the adapter plate. (The upper end portions 24 of the guide thimbles 14 contain the remaining features of the present invention to be described below.) Each lower retainer 50 on one guide thimble 14 has a series of scallops 52 formed on its periphery which are aligned with those of the fuel rods 18 grouped about the respective one guide thimble so that the fuel rods may be removed and replaced during reconstitution of the fuel assembly 10.

Furthermore, the top nozzle 22 includes a plurality of upstanding bosses 54 having respective central bores 56 defined therethrough. The bosses 54 are disposed above the upper hold-down plate 30, and each boss is attached to the hold-down plate 30 such that its central bore 56 is aligned with a respective one of the passageways 44 of the hold-down plate. Additionally, each boss 54 is of a cross-sectional size adapted to interfit within one of a plurality of holes (not shown) formed in the upper core plate (not shown) which open at a lower side thereof. The upper circumferential edge 64 of each boss 54 is chamfered for mating with a complementarily chamfered edge (not shown) on the lower side of the upper core plate at the entrance to each of the holes defined therein. Edges having such shapes act as guiding surfaces which facilitate alignment and insertion of the respective bosses into the corresponding holes in the upper core plate during installation of the fuel assembly within the reactor core.

As mentioned above, the hold-down coil springs 42 are disposed within the enclosure 32 and extend between the lower adapter plate 34 and the upper hold-down plate 30 and support the upper plate in a spaced relation above the lower plate at a stationary position in which the upper plate abuts the lower side of the upper core plate (not shown) with the upstanding bosses 54 interfitted within the holes of the upper core plate. Also, the upper hold-down plate 30 is composed of an array of hubs 68 and ligaments 70 which extend between and interconnect the hubs. Each of the hubs 68 has one of the passageways 44 defined therethrough. Furthermore, one boss 54 is disposed above and connected to each of the hubs 68 with the bore 56 of the boss aligned with the respective passageway 44 of the hub.

Finally, the top nozzle 22 includes means interconnecting the spaced upper and lower plates 30,34 so as to accommodate movement of the lower plate 34 toward and away from the upper plate 30 upon axial movement of the guide thimbles 14 of the fuel assembly 10, such as due to thermal growth, toward and away from the upper core plate (not shown). Also, the interconnecting means is effective to limit movement of the lower adapter plate 34 away from the upper hold-down plate 30 so as to maintain the springs 42 in a state of compression therebetween. In particular, the interconnecting means includes a plurality of lugs 72 connected to and extending downwardly from peripheral ones of the ligaments 70. The lugs 72 are respectively coupled to the upstanding wall portions 38 of the discontinuous sidewall 36 of the enclosure 32. Specifically, a generally vertical slot 74 is formed in each wall portion 38 and opens at the upper end thereof. A removable locking pin 76 is inserted horizontally into the upper end of the wall portion 38 to close the upper end of the slot 74 and a pin 78 mounted in the lower end of each lug 72 extends into the slot 74 below the locking pin 76 for slidable movement therealong as the upper and lower plates 30,34 move relative to one another. In such arrangement, the locking pin 76 and the lower end of the slot 74 respectively define the limits of movement of the lower adapter plate 34 toward and away from the upper hold-down plate 30.

ARRANGEMENT FOR ATTACHING AND REATTACHING TOP NOZZLE IN RECONSTITUTABLE FUEL ASSEMBLY

Referring now to FIGS. 4 to 9, there is shown the features of the arrangement for attaching and reattaching the top nozzle, generally designated 80, which together constitute the present invention. Specifically, these features include, first, the elongated sleeve members 40 of which one is shown disposed relative to one of the hold-down coil springs 42 between the upper and lower plates 30,34 and, second, complementary means, generally indicated at 82, on each of the sleeve members and the guide thimble upper end portions 24 which attach the top nozzle 22 and guide thimbles 14 together.

Each sleeve member 40 includes an inner tubular alignment sleeve portion 84, an outer tubular shroud portion 86 and an intermediate annular flange portion 88. The inner alignment sleeve portion 84 is disposed within the coil spring 42, extends between plates 30,34 in alignment with the respective passageway 44 and opening 46 thereof, and receives the guide thimble upper end portion 24. Also, at its upper end 90 the inner sleeve portion 84 is inserted into the passageway 44 of the hold-down plate 30, while at its lower end 92 it rests on the adapter plate 34 adjacent the opening 46 therethrough.

Figure 8:
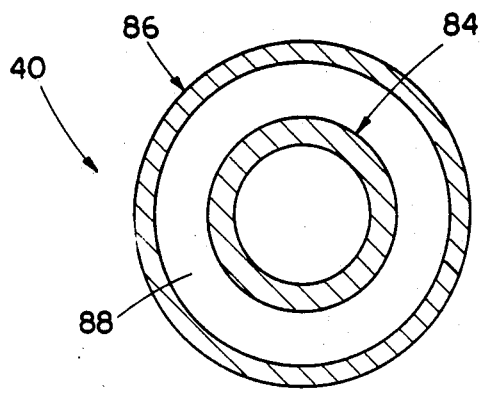
FIG. 8 is a cross-sectional view of the sleeve member as taken along line 8—8 of FIG. 7, showing the outer shroud portion encompassing the inner alignment sleeve portion of the sleeve member.
Figure 7:
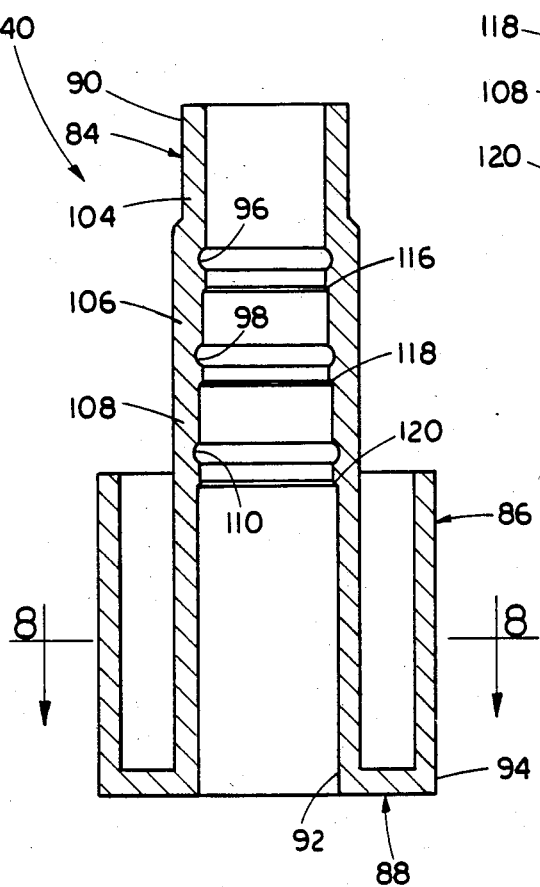
FIG. 7 is an enlarged sectional view of the sleeve member removed from the top nozzle.

The outer tubular shroud portion 86 of the sleeve member 40 is disposed in concentric but outwardly spaced relation to the inner alignment sleeve portion 84, as clearly depicted especially in FIGS. 7 and 8. The outer shroud portion 86 has a lower end 94 resting on the adapter plate 34 also.

From its lower end 94, the outer shroud portion 86 extends upwardly about a portion of the spring 42 for protecting the spring from damage by coolant cross flow from fuel assemblies located adjacent to the fuel assembly 10. The downward force of the spring 42 retains the sleeve member 40 in a generally stationary position upon and pressed against the adapter plate 34.

The intermediate annular flange portion 88, which underlies the coil spring 42, extends between and interconnects the respective lower ends 92,94 of the inner sleeve and outer shroud portions 84,86. The intermediate flange portion 88, together with the lower end 92 of the inner tubular alignment sleeve portion 84 and the lower end 94 of the outer shroud portion 86 being connected to the flange portion, are all disposed in an unattached but contacting relationship with respect to the adapter plate 34 about the opening 46 therethrough.

The complementary means 82 is formed on and interconnects the inner alignment sleeve portion 84 of each sleeve member 40 and the upper end portion 24 of each guide thimble 14 so as to attach the individual pairs of the sleeve member 40 and corresponding guide thimbles 14 together. The complementary means 82 includes serially arranged and spaced apart primary, secondary and tertiary annular grooves 96,98,100 formed circumferentially, such as by machining, on the interior 102 of the tubular alignment sleeve portion 84, with the primary groove 96 being located at the highest level and the tertiary groove 100 at the lowest level on the sleeve portion interior.

Further, the complementary means 82 includes a progressive series of primary, secondary and tertiary interior sections 104,106,108 on the interior 102 of the alignment sleeve portion 84 which respectively contain the primary, secondary and tertiary annular grooves 96,98,100. The secondary and tertiary sections 106,108 are formed, such as by machining, on the interior 102 relative to the primary section 104 so as to provide regions of increasing relief immediately below each preceding groove. More particularly, the secondary section 106, being disposed below the primary section 104, has an interior diameter larger than that of the primary section, whereas the tertiary section 108, being disposed below the secondary section 106, has an interior diameter larger than that of the secondary section. As will be explained below, these regions of increasing relief on the interior 102 of the alignment sleeve portion 84 facilitate subsequent reconnections of the alignment sleeve portion and the respective guide thimble 14 together after reconstitution of the fuel assembly 10.

Finally, the complementary means 82 also includes a primary exterior (360-degree) circumferential bulge 110 (see FIG. 4) formed on the guide thimble upper end portion 24, by a suitable bulging tool which fits within the guide thimble. The primary bulge 110 extends into the primary annular groove 96 so as to rigidly connect the sleeve member 40 and guide thimble 14 together. After an upper segment 112 of the guide thimble upper end portion 24 has been severed (see FIG. 5), by any suitable internal cutter, followed by removal and replacement of the top nozzle 22 at the initial reconstitution of the fuel assembly 10, the secondary groove 98 will receive a secondary exterior bulge 114 formed on the guide thimble upper end portion 24 in the same way as the primary bulge 110. If there should occur a second reconstitution of the fuel assembly 10 (which is unusual), then the tertiary groove 100 will receive a tertiary exterior bulge (not shown). The tertiary bulge would be formed on the guide thimble upper end portion 24 in the same way as the primary and secondary bulges 110,114, after severance of a second upper segment of the upper end portion, which now would contain the secondary bulge 114, followed by removal and receipt of the twice severed guide thimble upper end portion 24 from and back in the alignment sleeve portion 84, for reconnection of the alignment sleeve portion 84 and the twice severed guide thimble 14 together.

Figure 9:
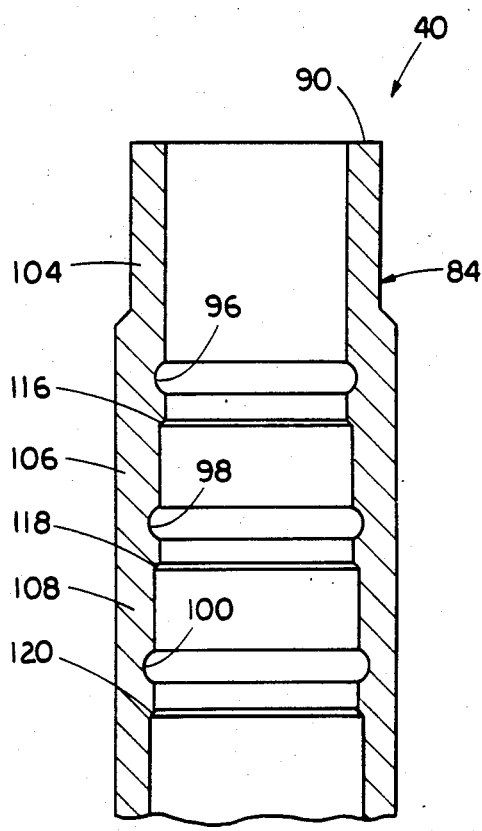
FIG. 9 is an enlarged fragmentary sectional view of the inner alignment sleeve portion of the sleeve member of FIG. 7, showing a series of grooves and relieved sections formed at axially spaced locations along the interior of the alignment sleeve portion.

The purpose for the presence of the relieved secondary and tertiary sections on the interior 102 of the alignment sleeve portion 84 of the sleeve member 40 is to facilitate subsequent insertion of the severed end of the guide thimble 14 back into the sleeve portion. To explain, when a bulge-type joint is made, the material immediately above and below the bulge is pushed radially outward into contact with the outside member (in this case, the sleeve portion). Since this causes plastic deformation of the material, the outside diameter of the guide thimble annular part being bulged from inside the thimble is permanently expanded by about 2 to 5 mils on the diameter immediately above and below the bulge. Therefore, to aid in reinserting the severed upper end portion 24 of the guide thimble 14 into the alignment sleeve portion 84 of the member 40, the sleeve portion is relieved radially outward below each bulge-receiving groove, as best seen in FIG. 9. It would be difficult, if not impossible, to reinsert the severed guide thimble back into the sleeve portion 84 without these relieved sections. It should be noted that 45-degree inward and upward tapered transitions 116,118,120 respectively interconnect the primary, secondary and tertiary sections 104,106,108 with the next lower, relieved section so that there is no hangup when lowering the top nozzle 22 back on the guide thimbles 14.

Figure 4:
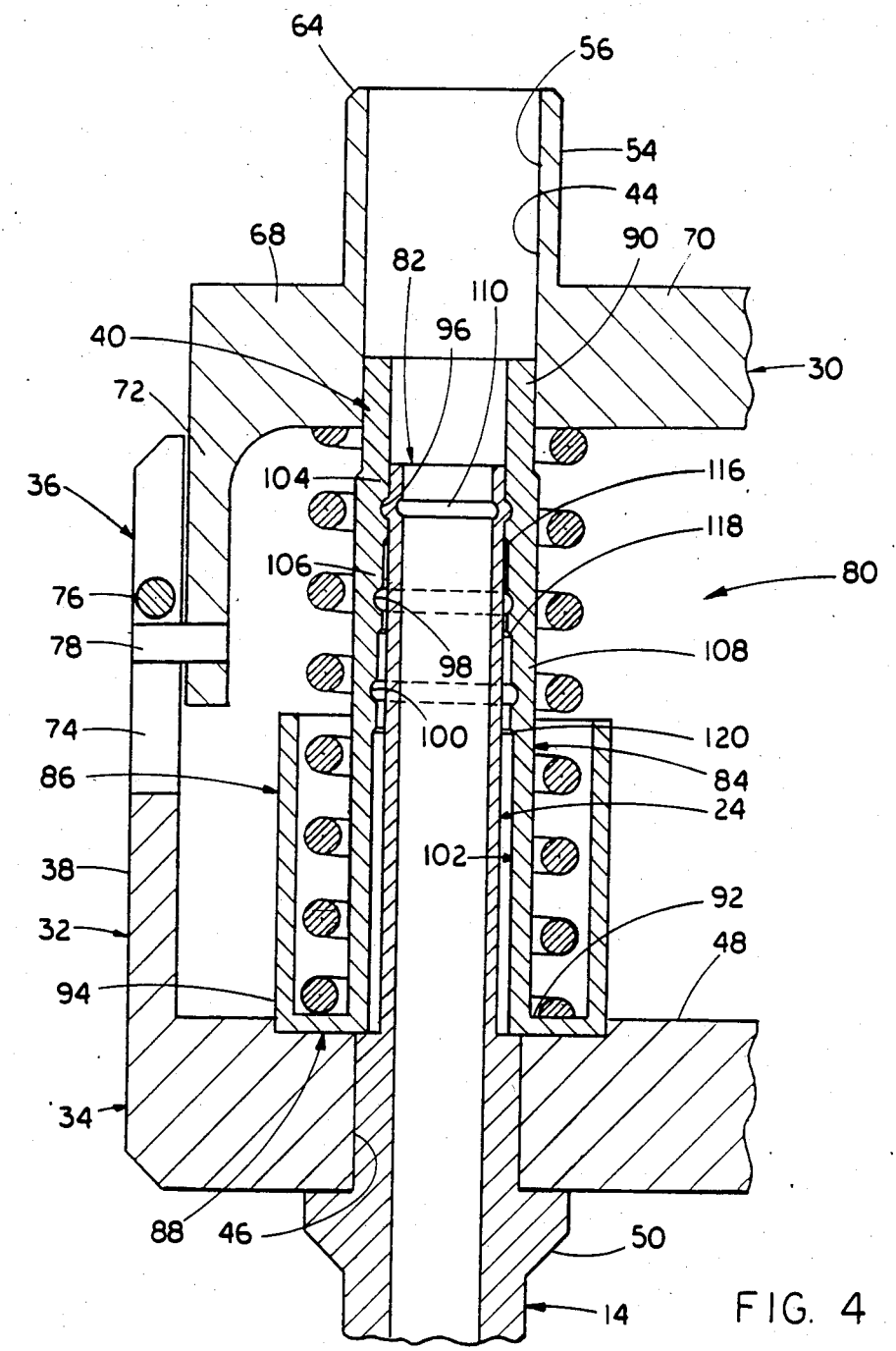
FIG. 4 is an enlarged fragmentary sectional view of the top nozzle and an upper end portion of one guide thimble of the fuel assembly as taken along line 4—4 of FIG. 2, showing a sleeve member having an inner alignment sleeve portion connected to the guide thimble upper end portion and an outer tubular shroud portion encompassing the hold-down coil spring which, in turn, surrounds the inner alignment sleeve portion.
Figure 5:
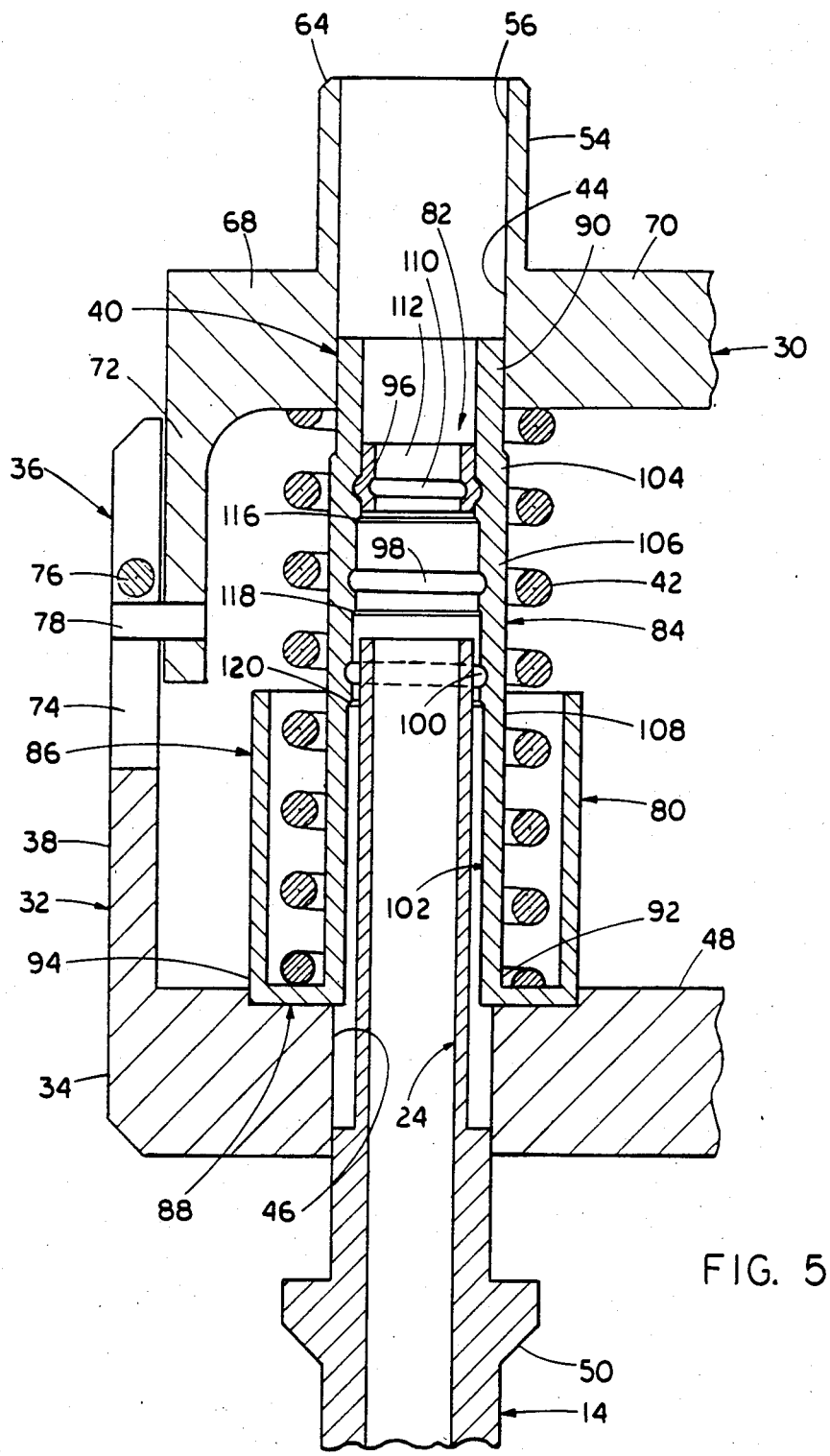
FIG. 5 is another enlarged fragmentary sectional view similar to that of FIG. 4, but showing an upper segment of the guide thimble upper end portion containing the bulge which interconnects with the inner alignment sleeve portion of the sleeve member after being severed from the remainder of the guide thimble upper end portion in preparation for removal of the top nozzle from the guide thimble.
Figure 6:
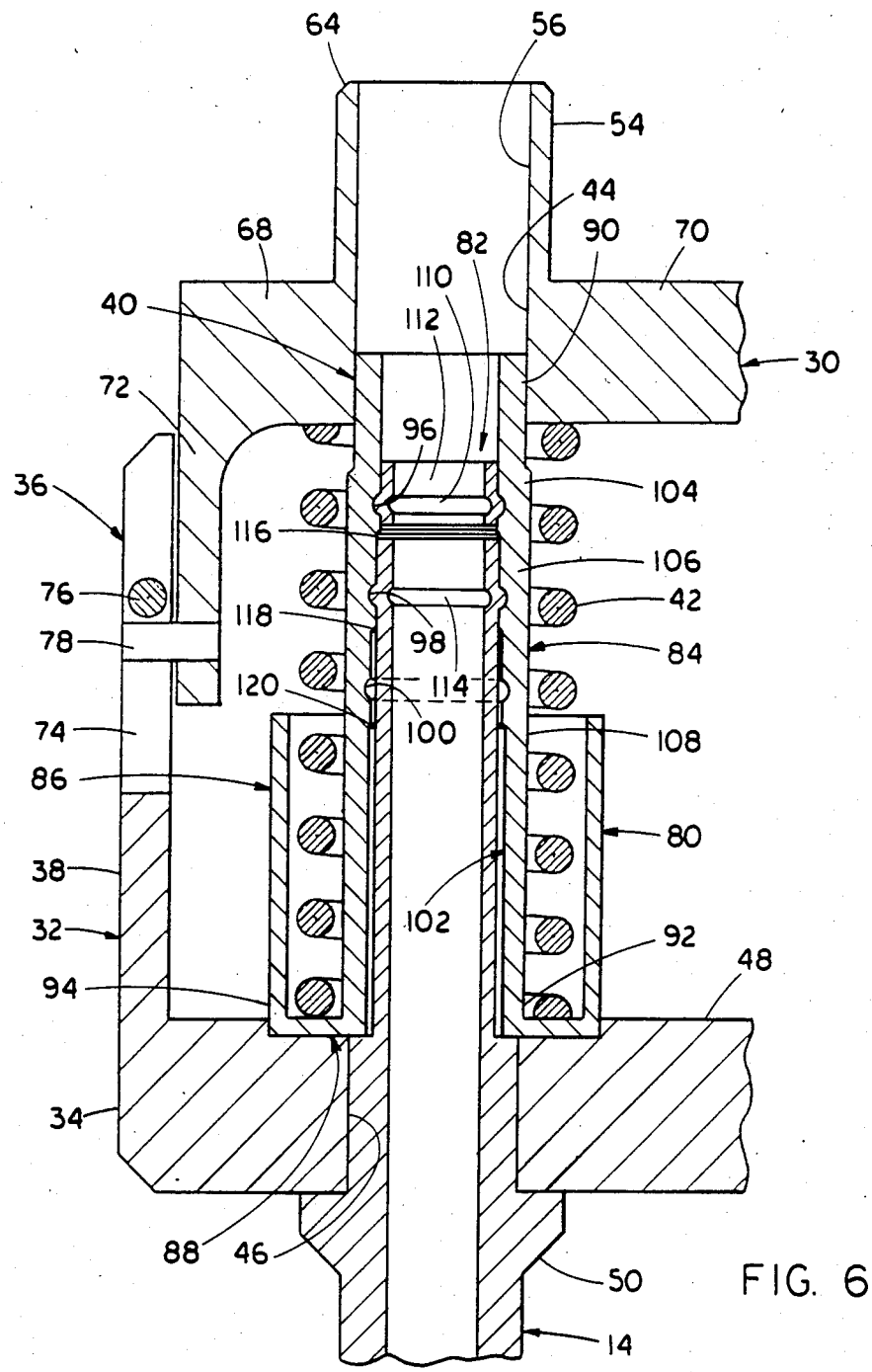
FIG. 6 is yet another enlarged fragmentary sectional view similar to that of FIG. 4, but showing the top nozzle replaced back on the guide thimble and another lower segment of the guide thimble upper end portion interconnected with the inner alignment sleeve portion by being bulged therewithin.

To summarize, the steps carried out in attaching and reattaching the top nozzle 22 to the guide thimbles 14 of the reconstitutable fuel assembly 10 are depicted in FIGS. 4 to 6. In FIG. 4, the guide thimble upper end portion 24 has been inserted into the alignment sleeve portion 84 which includes at least the upper primary and lower secondary annular grooves 96,98 and an annular part of the upper end portion 24 internally formed by a suitable conventional tool as the primary exterior bulge 110. The primary bulge 110 extends outwardly into the primary annular groove 96 in the alignment sleeve portion 84 so as to connect the sleeve member 40 and guide thimble 14 together.

Then, as seen in FIG. 5, when initial reconstitution of the fuel assembly 10 is desired, by using a suitable conventional internal cutter, the guide thimble upper end portion 24 is circumferentially cut at a location below the level of its annular part 110 bulged into the upper primary annular groove 96 but above the level of the lower secondary annular groove 98, for instance approximately at the location of the first transition 116 between the primary and secondary sections 104,106. In such manner, the upper segment 112 of the guide thimble upper end portion 24 which contains the primary bulged annular part 110 is severed from the remainder of the guide thimble 14. It will be noted that this segment 112 remains rigidly attached within the sleeve portion 84 and because of its position will not interfere (see FIG. 6) when the top nozzle 22 is reinserted back on the guide thimble 14.

By using another suitable fixture, such as disclosed in the third patent application cross-referenced above, the top nozzle, including the alignment sleeve 84 with upper guide thimble segment 112 connected thereto, can be removed from the severed guide thimble upper end portion 24 for exposing the fuel rods 18 of the fuel assembly 10 for reconstitution. Note that there are no loose parts and the hold-down plate 30, hold-down springs 42 and sleeve members 40 remain in place on the removed top nozzle 22.

After reconstitution of the fuel assembly 10, the same fixture is used to reinsert the top nozzle 22 back on the severed upper end portion 24 of each guide thimble 14 such that the severed upper end portions are received into the sleeve members 40. Then, as seen in FIG. 6, another upper annular part (secondary bulge 114) of each severed guide thimble upper end portion 24 is bulged outwardly from its interior into the secondary annular groove 98 in the alignment sleeve portion 84 so as to reconnect the sleeve member 40 and guide thimble 14 together.

It is thought that the present invention and many of its attendant advantages will be understood from the foregoing description and it will be apparent that various changes may be made in the form, construction and arrangement thereof without departing from the spirit and scope of the invention or sacrificing all of its material advantages, the form hereinbefore described being merely a preferred or exemplary embodiment thereof.

We claim:

1. In a reconstitutable fuel assembly having at least one control rod guide thimble and a top nozzle, said guide thimble including an upper end portion, said top nozzle including a lower adapter plate and an upper hold-down plate, said lower and upper plates having respectively an opening and passageway defined therethrough and aligned with one another, said opening in said lower plate receiving said guide thimble therethrough with its upper end portion extending above said lower plate and toward said passageway of said upper plate, an improved arrangement for mounting said top nozzle on said guide thimble, comprising:

(a) alignment means extending between said plates and receiving said guide thimble upper end portion, said means at an upper end being inserted into said passageway of said upper hold-down plate and at a lower end resting on said adapter plate; and (b) complementary means formed on and interconnecting said alignment means and said guide thimble upper end portion so as to connect said alignment means and said guide thimble together, said complementary means including a primary interior annular groove formed on said alignment means and a primary exterior bulge formed on said guide thimble upper end portion and extending into said primary annular groove;

(c) said complementary means further including a secondary interior annular groove formed on said alignment means at a location spaced below said primary annular groove, said secondary groove adapted to receive a secondary exterior bulge, being formed on said guide thimble upper end portion after severance of an upper segment of said guide thimble upper end portion containing said primary bulge followed by removal and receipt of said severed guide thimble upper end portion from and back in said alignment means, for reconnection of said alignment means and said severed guide thimble together;

(d) said complementary means still further including a primary interior section on said alignment means which contains said primary annular groove and a secondary interior section on said alignment means which contains said secondary annular groove, said secondary section being disposed below said primary section and having an interior diameter larger than that of said primary section for facilitating receiving of said severed guide thimble upper end portion back into said alignment means for reconnection of said alignment means and said severed guide thimble together.

2. The arrangement as recited in claim 1, wherein said complementary means further includes:

a tertiary interior annular groove formed on said alignment means at a location spaced below said secondary annular groove, said tertiary groove adapted to receive a tertiary exterior bulge, being formed on said guide thimble upper end portion after a second severance of a second upper segment of said guide thimble upper end portion contianing said secondary bulge followed by removal and receipt of said twice severed guide thimble upper end portion from and back in said alignment means, for reconnection of said alignment means and said twice severed guide thimble together; and a tertiary interior section on said alignment means which contains said tertiary annular groove, said tertiary section being disposed below said secondary section and having an interior diameter larger than that of said secondary section for facilitating receiving of said twice severed guide thimble upper end portion back into said alignment means for reconnection of said alignment means and said twice severed guide thimble together.

3. In a reconstitutable fuel assembly having at least one control rod guide thimble and a top nozzle, said guide thimble including an upper end portion, said top nozzle including a lower adapter plate and an upper hold-down plate, said lower and upper plates having respectively an opening and passageway defined therethrough and aligned with one another, said opening in said lower plate receiving said guide thimble therethrough with its upper end portion extending above said lower plate and toward said passageway of said upper plate, and a hold-down coil spring disposed about said guide thimble upper end portion and extending between said lower and upper plates for maintaining said upper plate in spaced relationship above said lower plate while allowing movement of said upper plate toward and away from said lower plate, an improved arrangement for mounting said top nozzle on said guide thimble, comprising:

(a) alignment means extending between said plates, within said coil spring and receiving said guide thimble upper end portion, said means at an upper end being inserted into said passageway of said upper hold-down plate and at a lower end resting on said adapter plate in contact therewith but in an unattached relationship with respect thereto;

(b) complementary means formed on and interconnecting said alignment means and said guide thimble upper end portion so as to connect said alignment means and said guide thimble together; and (c) an elongated shroud having a lower portion resting on said adapter plate in contact therewith but in an unattached relationship with respect thereto and underlying said coil spring and an upper portion extending along and surrounding a portion of said spring for protecting said spring from damage by coolant cross flow from adjacent fuel assemblies, said lower end of said alignment means and said lower portion of said shroud being interconnected together but unattached to said adapter plate.

4. In a reconstitutable fuel assembly having at least one control rod guide thimble and a top nozzle, said guide thimble including an upper end portion, said top nozzle including a lower adapter plate and an upper hold-down plate, said lower and upper plates having respectively an opening and passageway defined therethrough and aligned with one another, said opening in said lower plate receiving said guide thimble therethrough with its upper end portion extending above said lower plate and toward said passageway of said upper plate, a hold-down coil spring disposed about said guide thimble upper end portion and extending between said lower and upper plates for maintaining said upper plate in spaced relationship above said lower plate while allowing movement of said upper plate toward and away from said lower plate, means disposed between and interconnecting said lower and upper plates for defining the limits of movement of said plates toward and away from each other, an improved arrangement for attaching and detaching said top nozzle on and from said guide thimble, comprising:

(a) a sleeve member including
  (i) an inner tubular alignment sleeve portion extending within said coil spring between said plates in alignment with said opening and passageway thereof and receiving said guide thimble upper end portion, said inner sleeve portion at an upper end being inserted into said passageway of said upper hold-down plate and at a lower end resting on said adapter plate adjacent said opening therethrough,
  (ii) an outer tubular shroud portion having a lower end resting on said adapter plate extending upwardly therefrom along and surrounding a portion of said spring for protecting said spring from damage by coolant cross flow from adjacent fuel assemblies,
  (iii) an intermediate annular flange portion underlying said coil spring, resting on said adapter plate adjacent said opening therethrough, and interconnecting said inner alignment sleeve portion and said outer shroud portion, and
  (iv) said intermediate flange portion, together with said lower end of the inner alignment sleeve portion and said lower end of said outer shroud portion which are connected to said flange portion, all being disposed in an unattached but contacting relationship with respect to said adapter plate about said opening therethrough; and (b) complementary means formed on and interconnecting said inner alignment sleeve portion and said guide thimble upper end portion so as to connect said alignment sleeve portion and said guide thimble together, said complementary means including a primary interior annular groove formed on said alignment sleeve portion and a primary exterior bulge formed on said guide thimble upper end portion and extending into said primary annular groove.

5. The arrangement as recited in claim 4, wherein said complementary means further includes a secondary interior annular groove formed on said alignment sleeve portion at a location spaced below said primary annular groove, said secondary groove adapted to receive a secondary exterior bulge, being formed on said guide thimble upper end portion after severance of an upper segment of said guide thimble upper end portion containing said primary bulge followed by removal and receipt of said severed guide thimble upper end portion from and back in said alignment sleeve portion, for reconnection of said alignment sleeve portion and said severed guide thimble together.

6. The arrangement as recited in claim 5, wherein said complementary means also includes:
   a primary interior section on said alignment sleeve portion which contains said primary annular groove; and
   a secondary interior section on said alignment sleeve portion which contains said secondary annular groove, said secondary section being disposed below said primary section and having an interior diameter larger than that of said primary section for facilitating receiving of said severed guide thimble upper end portion back into said alignment sleeve portion for reconnection of said alignment sleeve portion and said severed guide thimble together.

7. The arrangement as recited in claim 6, wherein said complementary means further includes:
   a tertiary interior annular groove formed on said alignment sleeve portion at a location spaced below said secondary annular groove, said tertiary groove adapted to receive a tertiary exterior bulge, being formed on said guide thimble upper end portion after a second severance of a second upper segment of said guide thimble upper end portion containing said secondary bulge followed by removal and receipt of said twice severed guide thimble upper end portion from and back in said alignment sleeve portion, for reconnection of said alignment sleeve portion and said twice severed guide thimble together; and
   a tertiary interior section on said alignment sleeve portion which contains said tertiary annular groove, said tertiary section being disposed below said secondary section and having an interior diameter larger than that of said secondary section for facilitating receiving of said twice severed guide thimble upper end portion back into said alignment sleeve portion for reconnection of said alignment sleeve portion and said twice severed guide thimble together.

8. In a method of making a nuclear fuel assembly reconstitutable, wherein said fuel assembly has at least one control rod guide thimble and a top nozzle, said guide thimble including an upper end portion, said top nozzle including a lower adapter plate and an upper hold-down plate, said lower and upper plates having respectively an opening and passageway defined therethrough and aligned with one another, said opening in said lower plate for receiving said guide thimble therethrough with its upper end portion extending above said lower plate and toward said passageway of said upper plate, and an alignment sleeve extending between said plates for receiving said guide thimble upper end portion, said sleeve at an upper end being inserted into said passageway of said upper hold-down plate and at a lower end resting on said adapter plate, said method comprising the steps of:
   (a) providing said sleeve with at least a pair of internal upper and lower annular grooves;
   (b) inserting said upper end portion of said guide thimble into said sleeve such that said upper end portion thereof extends adjacent said upper annular groove;
   (c) bulging an annular part of said guide thimble upper end portion outwardly into said upper annular groove in said alignment sleeve so as to connect said sleeve and guide thimble together;
   (d) circumferentially cutting said guide thimble upper end portion at a location below the level of its annular part bulged into said upper annular groove in said alignment sleeve and above the level of said lower annular groove in said alignment sleeve to sever an upper segment of said guide thimble upper end portion containing said bulged annular part from the remainder thereof;
   (e) removing said top nozzle, including said alignment sleeve with said upper guide thimble segment connected thereto, from said severed guide thimble upper end portion for facilitating reconstitution of said fuel assembly;
   (f) reinserting said severed upper end portion of said guide thimble into said sleeve such that said severed upper end portion thereof extends adjacent said lower annular groove; and
   (g) bulging another annular part of said severed guide thimble upper end portion outwardly into said lower annular groove in said alignment sleeve so as to connect said sleeve and guide thimble together.

* * * * *